F. C. HODKINSON.
CONDUIT FOR ELECTRIC WIRES.
APPLICATION FILED JAN. 15, 1912.
1,189,208.
Patented June 27, 1916.
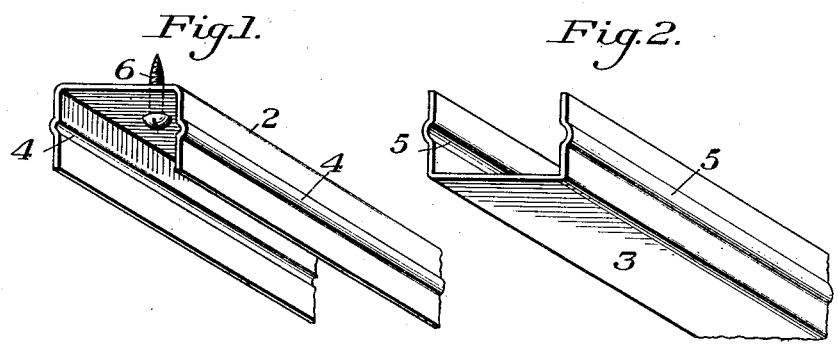
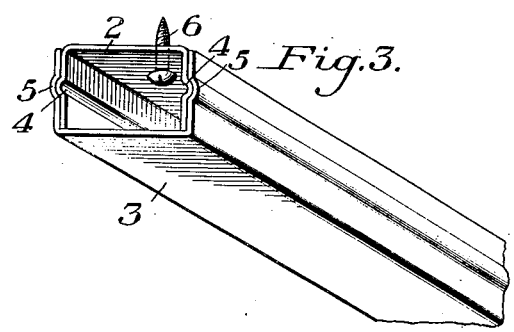
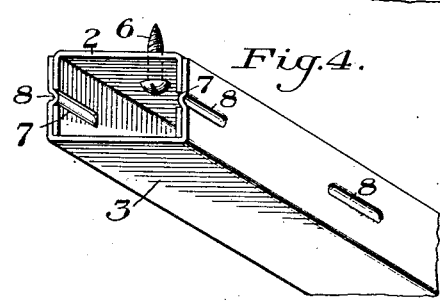
WITNESSES
INVENTOR

UNITED STATES PATENT OFFICE.

FRANK C. HODKINSON, OF PITTSBURGH, PENNSYLVANIA, ASSIGNOR TO SAFETY ARMORITE CONDUIT COMPANY, OF PITTSBURGH, PENNSYLVANIA, A CORPORATION OF PENNSYLVANIA.

CONDUIT FOR ELECTRIC WIRES.

1,189,208.  Specification of Letters Patent.  Patented June 27, 1916.

Application filed January 15, 1912. Serial No. 671,383.

*To all whom it may concern:*

Be it known that I, FRANK C. HODKINSON, a resident of Pittsburgh, in the county of Allegheny and State of Pennsylvania, have invented a new and useful Improvement in Conduits for Electric Wires, of which the following is a full, clear, and exact description, reference being had to the accompanying drawings, forming part of this specification, in which—

Figure 1 is a perspective view showing a portion of one of the conduit members; Fig. 2 is a similar view showing a portion of the other conduit member; Fig. 3 is a perspective view showing the two members applied; and Fig. 4 is a similar view showing a modification.

My invention has relation to conduits for electric wires, and it is more particularly designed to provide a conduit for interior wiring, and which is in the form of a hollow molding which can be readily attached to a wall or ceiling and through which the electric wires may be carried.

The object of my invention is to provide a conduit of this character which can be easily and cheaply manufactured and can be readily installed.

Referring to the accompanying drawings, the numeral 2 designates one of the conduit-forming members and the numeral 3 the other conduit-forming member. Each of these conduit members is of a trough or U-form in cross section and the two members are adapted to be applied to each other to form a hollow rectangular or oval box-like structure, as shown in Fig. 3. The side walls of one of the members, in the present instance, the member 2, are formed with longitudinal beads or ribs 4, pressed in the metal thereof, and which are adapted to be sprung into engagement with corresponding grooves 5, formed in the sides of the other member. The member 2 which constitutes the base member, is provided at suitable intervals with seats for securing screws 6, by means of which the conduit may be readily attached to a wall or ceiling.

The advantages of my invention will be apparent, since it provides a neat appearing form of conduit which can be manufactured readily and cheaply, and which can also be easily and quickly installed.

I do not desire to limit myself to the exact form of the two members herein shown and described, since it is obvious that they may be varied in shape, without departing from the spirit and scope of my invention, as defined in the claim, and it will also be obvious that instead of the continuous interfitting ribs and grooves, by which the two sections are secured to each other, interlocking means may be provided. Thus, in Fig. 4, I have shown one of the members as having openings 7 at intervals, engaged by projections 8 on the other member.

I claim:

A conduit of the class described, comprising two substantially counterpart sections of sheet metal of generally rectangular trough form, the two sections being applied to each other reversely with the lateral flanges of one section lying within the lateral flanges of the other section and having its edges abutting the closing side of said other section, thereby forming a hollow box-like structure of generally rectangular cross-section, having doubled lateral walls, said lateral walls having complementary rib and groove portions sprung into engagement with each other to normally prevent separation of the sections; substantially as described.

In testimony whereof, I have hereunto set my hand.

FRANK C. HODKINSON.

Witnesses:
 G. M. VIERS,
 H. M. CORWIN.